United States Patent
Liu et al.

(10) Patent No.: US 11,583,966 B2
(45) Date of Patent: Feb. 21, 2023

(54) OVERHEAD MACHINING DEVICE BASED ON PORTABLE FIVE-DEGREE-OF-FREEDOM FULL PARALLEL MODULE

(71) Applicant: TSINGHUA UNIVERSITY, Beijing (CN)

(72) Inventors: Xinjun Liu, Beijing (CN); Fugui Xie, Beijing (CN); Zenghui Xie, Beijing (CN); Jinsong Wang, Beijing (CN)

(73) Assignee: TSINGHUA UNIVERSITY

( * ) Notice: Subject to any disclaimer, the term of this patent is extended or adjusted under 35 U.S.C. 154(b) by 39 days.

(21) Appl. No.: 16/955,468

(22) PCT Filed: Nov. 19, 2018

(86) PCT No.: PCT/CN2018/116117
§ 371 (c)(1),
(2) Date: Jun. 18, 2020

(87) PCT Pub. No.: WO2019/214205
PCT Pub. Date: Nov. 14, 2019

(65) Prior Publication Data
US 2021/0046595 A1 Feb. 18, 2021
US 2021/0339349 A9 Nov. 4, 2021

(30) Foreign Application Priority Data

May 11, 2018 (CN) .......................... 201810448274.5

(51) Int. Cl.
*B23Q 1/44* (2006.01)
*B23Q 1/54* (2006.01)
(Continued)

(52) U.S. Cl.
CPC ................ *B23Q 1/26* (2013.01); *B23C 1/002* (2013.01); *B23C 1/12* (2013.01); *B23C 1/14* (2013.01);
(Continued)

(58) Field of Classification Search
CPC ............................ B25J 9/0069; B23Q 1/5462
See application file for complete search history.

(56) References Cited

U.S. PATENT DOCUMENTS 4,776,749 A * 10/1988 Wanzenberg ........ B25J 17/0266
901/14
6,719,506 B2 * 4/2004 Chang .................. B23Q 1/5462
409/201

(Continued)

FOREIGN PATENT DOCUMENTS

CN    101491899 A  *  7/2009
CN    102672714 A  *  9/2012
(Continued)

OTHER PUBLICATIONS

Machine Translation of JP 2005-028558 A, which JP '558 was published Feb. 2005.*
(Continued)

*Primary Examiner* — Erica E Cadugan
(74) *Attorney, Agent, or Firm* — Troutman Pepper Hamilton Sanders LLP (Rochester)

(57) ABSTRACT

The present invention discloses an machining device based on a portable 5-DOF parallel module. The machining device based on a portable 5-DOF parallel module comprises: a table for moving a parallel module to increase the stroke of the machine tool such that the machine tool can machine large components and can also simultaneously conduct the mounting and the machining of workpieces at different stations; a CNC rotary table; and a portable 5-DOF parallel
(Continued)

module. The portable parallel module has a large swing angle range, can conduct the conversion between vertical and horizontal machining modes and can achieve five-face machining in one setup in cooperation with the CNC rotary table. The parallel module can move flexibly, and can machine large and complex components after mounted on the sliding table. After the machining of the workpiece is completed, the parallel module can move to the position of a mounted component through the table to conduct the machining of the next component. Thus, the mounting and the machining of the workpiece are simultaneously conducted at different stations, and the utilization rate and the production efficiency of the portable parallel module are improved.

7 Claims, 4 Drawing Sheets

(51) Int. Cl.
  *B23Q 1/01* (2006.01)
  *B23C 1/14* (2006.01)
  *B23C 1/12* (2006.01)
  *B25J 9/10* (2006.01)
  *B25J 11/00* (2006.01)
  *B23Q 1/26* (2006.01)
  *B25J 9/00* (2006.01)
  *B23Q 1/52* (2006.01)
  *B23C 1/00* (2006.01)
(52) U.S. Cl.
  CPC ............... *B23Q 1/01* (2013.01); *B23Q 1/012* (2013.01); *B23Q 1/522* (2013.01); *B23Q 1/5462* (2013.01); *B25J 9/0072* (2013.01); *Y10T 409/305656* (2015.01); *Y10T 409/308288* (2015.01); *Y10T 409/308512* (2015.01)

(56) References Cited

U.S. PATENT DOCUMENTS

| | | | |
|---|---|---|---|
| 7,101,129 B2* | 9/2006 | Gronbach | B23Q 1/5462 |
| | | | 409/235 |
| 7,104,746 B2* | 9/2006 | Schwaar | B25J 17/0266 |
| | | | 74/490.06 |
| 7,357,049 B2* | 4/2008 | Hermoso | B23Q 1/5462 |
| | | | 409/235 |
| 7,706,922 B2* | 4/2010 | Ueno | B25J 9/1623 |
| | | | 409/235 |
| 2017/0113356 A1* | 4/2017 | Huang | B25J 9/0069 |
| 2020/0230826 A1* | 7/2020 | Liu | B25J 17/0283 |
| 2021/0229265 A1* | 7/2021 | Xie | B25J 11/0065 |

FOREIGN PATENT DOCUMENTS

| | | |
|---|---|---|
| CN | 102699898 | 10/2012 |
| CN | 103753355 | 4/2014 |
| CN | 206343904 | 7/2017 |
| CN | 107553470 | 1/2018 |
| CN | 108340167 | 7/2018 |
| JP | 2005-028558 A * | 2/2005 |
| WO | 2017090105 | 6/2017 |

OTHER PUBLICATIONS

Machine Translation of CN 102672714-A, which CN '714 was published Sep. 2012.*
Machine Translation of CN-101491899-A, which CN '899 was published Jul. 2009.*
Online article titled "Universal Joints Characteristics and Applications from SDP SI", copyright 2022, 8 pages, downloaded Jun. 27, 2022 from https://www.sdp-si.com/catalogs/D757-Couplings-Universal-Joints3.php.*
International Search Report dated Feb. 15, 2019, International Application No. PCT/CN2018/116117, International Filing Date Nov. 19, 2018.

* cited by examiner

OVERHEAD MACHINING DEVICE BASED ON PORTABLE FIVE-DEGREE-OF-FREEDOM FULL PARALLEL MODULE

CROSS REFERENCE TO RELATED APPLICATIONS

This application is the national phase application under 371 of International Application No. PCT/CN2018/116117 filed Nov. 19, 2018, which claims priority to Chinese Patent Application No. 201810448274.5, filed on May 11, 2018.

TECHNICAL FIELD

The present invention relates to the field of computer numerical control (CNC) manufacturing technologies, and in particular to a machining device based on a portable five-degree-of-freedom (5-DOF) parallel module.

BACKGROUND

Recently, the mechanical design level is increasingly developing in the field of mechanical design and manufacture. The complex shapes such as spatial curved surfaces and irregular shaped holes usually appear in components. This has led to stricter requirements on manufacturing devices and machining techniques. To achieve the machining of such complex components, the manufacturing device should have the five-axis machining ability. In order to reduce the workpiece mounting times, improve the machining precision and the machining efficiency, the machining devices are required to have higher machining and rotating flexibility and to have ability to achieve five-face machining in one setup.

A parallel kinematic mechanism is a closed-loop parallel mechanism whose mobile platform and frame are connected by multiple chains. Compared with the traditional serial kinematic mechanism, the parallel kinematic mechanism has the advantages of compact structure, high rigidity, strong bearing capability, high response speed, absence of geometric error accumulation and amplification effect. Therefore, the parallel kinematic mechanism has become an ideal choice of the portable machining module. Because the lower-mobility parallel kinematic mechanisms (the DOF of which is less than six) are easier to have a large workspace, especially a rotation workspace, such mechanisms are widely researched. The 5-DOF parallel mechanism can achieve flexible five-axis motion, so it is utilized as the portable machining module here. However, compared with the serial kinematic mechanism, the parallel kinematic mechanism still has the defects of short movement stroke and small workspace. Therefore, it is also hard to achieve the machining of large and complex components. In order to solve the problem, a feasible way is to combine a parallel machining module with a CNC rotary table and a sliding table. The advantages of the parallel kinematic mechanism are fully exerted. The novel machining device can ensure high rigidity, strong bearing capability, large swing angle range, and five-axis machining ability and expands the movement stroke and the machining range.

With the rapid development of the mechanical design and manufacture industry, demands on the complex components are increased day by day. However, the traditional machine tool generally utilizes a machining manner of firstly mounting the workpieces and then machining them at the same position, this inevitably causes the stop of the machine tool during mounting. Therefore, the usage rate of the machine tool and the yield of the components are reduced, which is urgent to be solved.

SUMMARY

The present invention seeks to solve the problems existing in the related art to at least some extent.

Accordingly, an objective of the present invention is to provide an machining device based on a portable 5-DOF parallel module, which may achieve the machining of large and complex components, simultaneously conducts the mounting and the machining of workpieces at different stations, and improves the usage rate and the production efficiency of a portable parallel module.

In order to achieve the above objective, an embodiment of the present invention provides a machining device based on a portable 5-DOF parallel module.

Using the portable 5-DOF parallel module, the machining device based on a portable 5-DOF parallel module of the embodiment of the present invention can achieve the machining of the large and complex components, conduct the mounting and the machining of the workpieces at the different stations simultaneously, and improve the usage rate and the production efficiency of the portable parallel module.

Additionally, the machining device based on a portable 5-DOF parallel module according to the embodiment of the present invention may further have the following additional technical characteristics:

Further, in one embodiment of the present invention, the portable 5-DOF parallel module comprises a portable frame, a spindle, a first chain, a second chain, a third chain, a fourth chain and a fifth chain for connecting the portable frame with the spindle to achieve five-axis motion.

Further, in one embodiment of the present invention, to the first chain, the first chain is connected with the portable frame through first and second revolute joints and is also connected with the spindle through a third revolute joint, rotation axes of the first and second revolute joints are vertical to each other and thus angled relative to one another. The first chain comprises an input-driven first screw-nut pair, a first nut of the first screw-nut pair is enabled to rotate about a nut axis thereof so as to cause a first screw of the first screw-nut pair to translate relative to the first nut along a length direction of the first chain. For the second, third, fourth and fifth chains, each of which is connected with the portable frame through fourth and fifth revolute joints and is also connected with the spindle through sixth and seventh revolute joints, rotation axes of the fourth and fifth revolute joints are vertical, and thus angled, to each other, and rotation axes of the sixth and seventh revolute joints are vertical, and thus angled to each other; each of which comprises an input-driven second screw-nut pair, a second nut of the second screw-nut pair is enabled to rotate about a nut axis thereof so as to cause a second screw of the second screw-nut pair to translate relative to the second nut along a length direction of a corresponding one of the second, third, fourth, and fifth chain.

Further, in one embodiment of the present invention, the first chain comprises the first motor. One end of the first motor is connected with the portable frame through the first and second revolute joints.

Further, in one embodiment of the present invention, to the first screw-nut pair, the first nut of the first screw-nut pair is fixedly connected with the first motor, the first nut of the first screw-nut pair is enabled to rotate about the nut axis thereof so as to cause the first screw of the first screw-nut pair to translate relative to the first nut along the length direction of the first chain. One end of the first screw of the first screw-nut pair is connected with the spindle through the third revolute joint.

Further, in one embodiment of the present invention, each of the second, third, fourth, and fifth chain comprises a second motor. One end of the second motor is connected with the portable frame through the fourth and fifth revolute joints.

Further, in one embodiment of the present invention, the second nut of the second screw-nut pair is fixedly connected with the second motor, the second nut of the second screw-nut pair is enabled to rotate about the nut axis thereof so as to cause the second screw of the screw-nut pair to translate relative to the second nut along the length direction of the corresponding one of the second, third, fourth and fifth chain. The second screw of each second screw-nut pair is connected with the spindle through the sixth and seventh revolute joints.

Further, in one embodiment of the present invention, a machine head of the portable 5-DOF parallel module is configured to move in a first swing angle so as to meet the preset conditions to convert between vertical and horizontal machining modes.

Further, in one embodiment of the present invention, after the machining of a component is completed, the portable parallel module can move to the position of a mounted next component by sliding on the table to machine the next component. Thus, the machining of the workpiece and the mounting of a next workpiece are simultaneously conducted at different positions, and the usage rate and the production efficiency of the portable parallel module are improved.

Further, in one embodiment of the present invention, the portable 5-DOF parallel module is driven hydraulically or by an electric cylinder or an air cylinder.

BRIEF DESCRIPTION OF THE DRAWINGS

These and other aspects and advantages of embodiments of the present invention will become apparent and more readily appreciated from the following descriptions made with reference to the accompanying drawings, in which.

DESCRIPTION OF REFERENCE SIGNS

1—table, 11—table base, 12—guide rail, and 13—T-shaped slot platform;
2—CNC rotary table, and 3—portable 5-DOF parallel module;
31—first chain, 311—first frame mounting part, 312—first annular rotary part, 313—first motor fixation flange, 314—first motor, 315—first screw, 316—first U—shaped rotary part, and 317—first spindle mounting part; 318 first nut;
32—second chain, 33—third chain, 331—third frame mounting part, 332—third annular rotary part, 333—third motor fixation flange, 334—third motor, 335—third screw, 336—third U-shaped rotary part, 337—third spherical rotary part, and 338—third spindle mounting part;
34—fourth chain, 35—fifth chain, 36—portable frame, and 37—spindle;
5 first revolute joint; 6—second revolute joint; 7—third revolute joint; 8—fourth revolute joint; 9—fifth revolute joint; 10—sixth revolute joint; 14—seventh revolute joint.

DESCRIPTION OF THE EMBODIMENTS

Embodiments of the present invention are described below in detail. Examples of the embodiments are shown in the accompanying drawings. The same or similar reference signs represent the same or similar elements or elements having the same or similar functions throughout the specification. The embodiments described below with reference to the accompanying drawings are exemplary, and are only used to explain the present invention but should not be construed as a limitation to the present invention.

The following describes an machining device based on a portable 5-DOF parallel module proposed according to an embodiment of the present invention with reference to the accompanying drawings.

Figure 1:
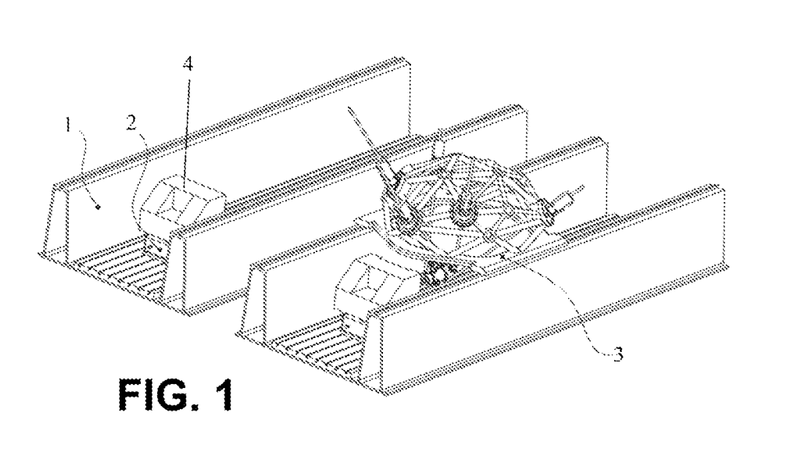
FIG. 1 is a schematic structural diagram of an machining device based on a portable 5-DOF parallel module according to an embodiment of the present invention.

FIG. 1 is a schematic structural diagram of an machining device based on a portable 5-DOF parallel module according to an embodiment of the present invention.

As shown in FIG. 1, the machining device based on a portable 5-DOF parallel module comprises: a table 1 for sliding and moving of the machine tool to the positions of the components; the stroke of the machine tool is increased; the machine tool can machine large components and can also simultaneously conduct the mounting and the machining of workpieces at different stations; a CNC rotary table 2; and a portable 5-DOF parallel module 3. The portable parallel module 3 has a large swing angle range, can conduct the conversion between vertical and horizontal machining modes and can achieve five-face machining at one setup in cooperation with the CNC rotary table. The parallel module of the machining device flexibly moves, and can machine large and complex components after the parallel module is mounted on the table. After the machining of the workpieces is completed, the parallel module can move to the position of a next mounted workpieces by sliding on the table to machine the next workpieces. Thus, the machining of the workpiece and the mounting of the next workpiece are simultaneously conducted at different positions, and the usage rate and the production efficiency of the portable parallel module are improved.

Figure 2:
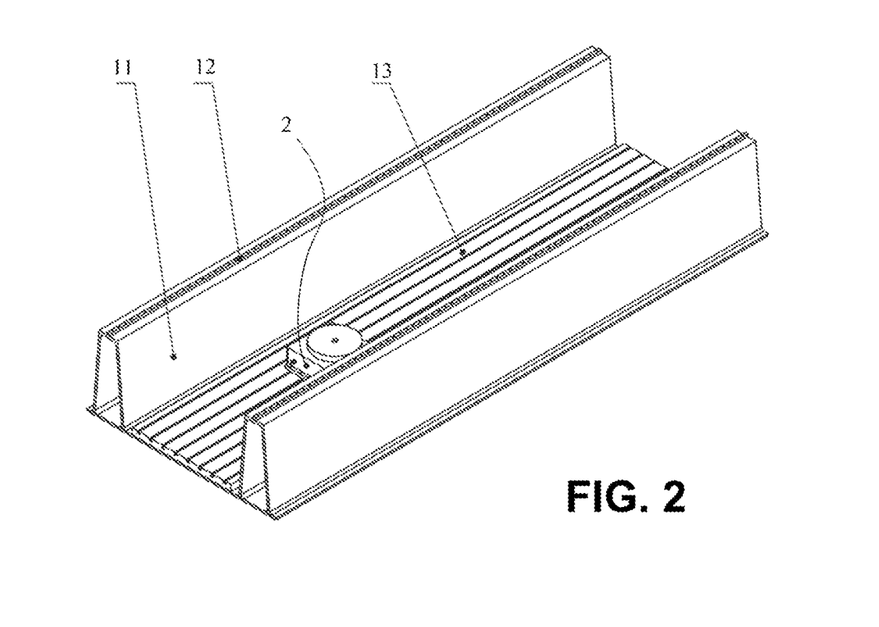
FIG. 2 is a schematic structural diagram of a table and a CNC rotary table according to an embodiment of the present invention.

Further, as shown in FIG. 2, in one embodiment of the present invention, the table 1 comprises a table base 11, a guide rail 12 and a T-shaped slot platform 13. The portable 5-DOF parallel module 3 is mounted on the guide rail 12 such that it can increase the movement stroke of the machine tool and achieve the machining of the large components.

Wherein the CNC rotary table 2 is mounted on the T-shaped slot platform 13 and is used for mounting the components to be machined. In combination with the portable 5-DOF parallel module 3, the CNC rotary table can achieve five-face machining while once mounting.

Figure 3:
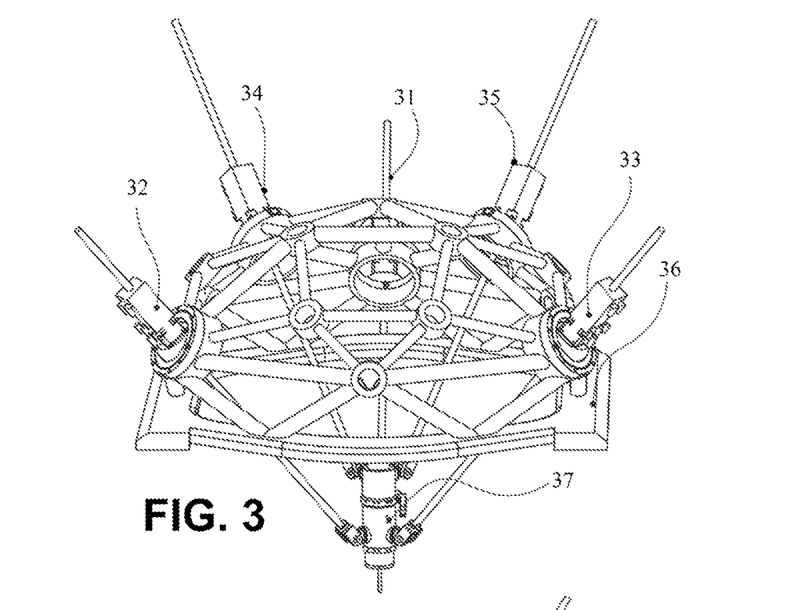
FIG. 3 is a schematic structural diagram of a portable 5-DOF parallel module according to an embodiment of the present invention.

As shown in FIG. 3, the portable 5-DOF parallel module 3 comprises the first chain 31, the second chain 32, the third chain 33, the fourth chain 34, the fifth chain 35, a portable frame 36 and a spindle 37, and the portable frame 36 is configured to be mounted on the guide rail 12.

One end of the first chain 31 is connected with the portable frame 36 through first 5 and second 6 revolute joints, and the rotation axes of the first and second revolute joints are vertical to/angled to each other; an other end of the first chain 31 is connected with the spindle 37 through a third revolute joint 7. The first chain 31 comprises an input-driven first screw-nut pair. One end of the second chain 32 is connected with the portable frame 36 through fourth 8 and fifth 9 revolute joints, and the rotation axes of the fourth and fifth revolute joints are vertical to/angled to each other; an other end of the second chain 32 is connected with the spindle 37 through sixth 10 and seventh 14 revolute joints, and the rotation axes of the sixth and seventh revolute joints are vertical to/angled to each other. The second chain 32 comprises an input-driven second screw-nut pair. The structures of the third chain 33, the fourth chain 34 and the fifth chain 35 are the same as the structure of the second chain 32. Wherein the five chains are respectively connected between the portable frame 36 and the spindle 37 to form a closed-loop parallel structure, thus achieving 5-DOF motion of the spindle 37, i.e., three rotational DOFs and two translational DOFs.

Further, in one embodiment of the present invention, the first chain 31 comprises the first motor. One end of the first motor is connected with the portable frame 36 through the first 5 and second 6 revolute joints. A first nut of the first screw-nut pair is fixedly connected with the first motor, the first nut of the first screw-nut pair is enabled to rotate about the nut axis thereof so as to cause a first screw 315 of the first screw-nut pair to translate relative to the first nut along the length direction of the first chain. One end of the screw of the first screw-nut pair is connected with the spindle 37 through the third revolute joint 7.

Figure 4:
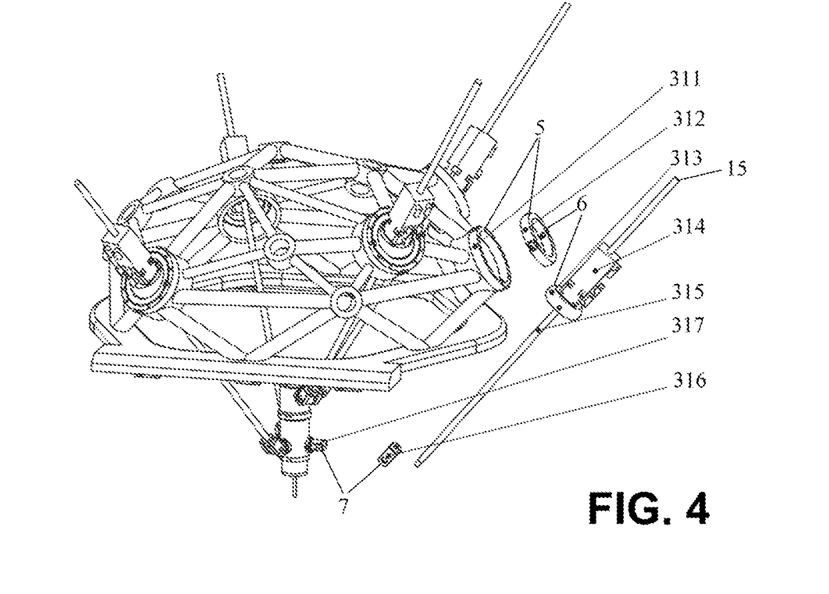
FIG. 4 is an exploded structural view of the first chain, a portable frame and a spindle of a portable 5-DOF parallel module according to an embodiment of the present invention.

Further, as shown in FIG. 4, the first chain 31 comprises the first frame mounting part 311, the first annular rotary part 312, the first motor fixation flange 313, the first motor 314, the first screw 315, the first U-shaped rotary part 316 and the first spindle mounting part 317. The first frame mounting part 311 is fixedly connected with the portable frame 36 to mount the first chain. The first annular rotary part 312 is mounted on the first frame mounting part 311 to form the first revolute joint 5. The first motor fixation flange 313 is mounted on the first annular rotary part 312 to form the second revolute joint 6; the axes of the first 5 and second 6 revolute joint are vertical to/angled to each other to form a Hooke's joint or a universal joint. The first motor 314 is fixedly connected with the first motor fixation flange 313. A rotor of the first motor is fixedly connected with the first nut of the first screw-nut pair, and the first nut of the first screw-nut pair is enabled to rotate about the nut axis thereof so as to cause the first screw 315 to translate relative to the first nut along the length direction of the first chain. The first screw 315 is fixedly connected with the first U-shaped rotary part 316. The first U-shaped rotary part 316 is connected with the first spindle mounting part 317 to form the third revolute joint 7. The first spindle mounting part 317 is fixedly connected with the spindle 37.

In another embodiment of the present invention, the first chain 31 may further include the first motor. One end of the first motor is connected with the portable frame 36 through a spherical joint or three revolute pairs, and rotation axes of the three revolute pairs are vertical to each other. The nut of the first screw-nut pair is fixedly connected with the first motor. The rotational DOF around the nut axis is able to be locked by a groove so as to achieve the translational DOF along the chain. The screw of the first screw-nut pair is connected with the spindle 37 through a revolute pair.

In one embodiment of the present invention, each of the second chain 32, the third chain 33, the fourth chain 34 and the fifth chain 35 comprises the second motor. One end of the second motor is connected with the portable frame 36 through the fourth 8 and fifth 9 revolute joints, and the rotation axes of the fourth 8 and fifth 9 revolute joints are vertical to/angled to each other. A second nut of the second screw-nut pair is fixedly connected with the second motor, the second nut of the second screw-nut pair is enabled to rotate about the nut axis thereof so as to cause the second screw of the second screw-nut pair to translate relative to the second nut along the length direction of the corresponding one of the second chain 32, the third chain 33, the fourth chain 34 and the fifth chain 35. The second screw of the second screw-nut pair is connected with the spindle 37 through the sixth 10 and seventh 14 revolute joints.

Figure 5:
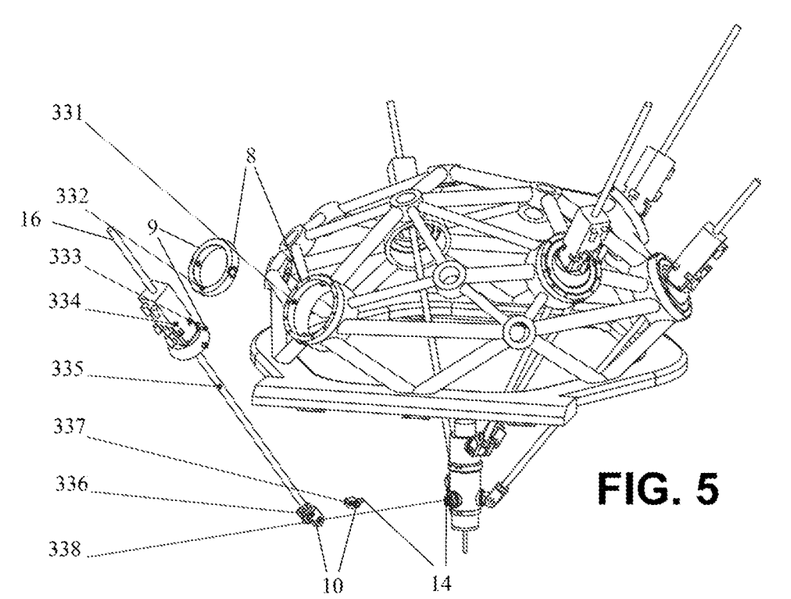
FIG. 5 is an exploded structural view of the third chain, a portable frame and a spindle of a portable 5-DOF parallel module according to an embodiment of the present invention.

Further, as shown in FIG. 5, the third chain 33 comprises the third frame mounting part 331, the third annular rotary part 332, the third motor fixation flange 333, the third motor 334, the third screw 335, the third U-shaped rotary part 336, the third spherical rotary part 337 and the third spindle mounting part 338. The third frame mounting part 331 is fixedly connected with the portable frame 36 to mount the third chain. The third annular rotary part 332 is mounted on the third frame mounting part 331 to form the fourth revolute joint 8. The third motor fixation flange 333 is mounted on the third annular rotary part 332 to form the fifth revolute joint 9; two axes of the revolute joint are vertical with/angled with each other to form a Hooke's joint or a universal joint. The third motor 334 is fixedly connected with the third motor fixation flange 333. A rotor of the third motor is fixedly connected with the nut of the third screw-nut pair, the third nut of the third screw-nut pair is enabled to rotate about the nut axis thereof so as to cause the third screw 335 of the third screw-nut pair to translate relative to the third nut along the third chain. The third screw 335 is fixedly connected with the third U-shaped rotary part 336. The third spherical rotary part 337 is mounted on the third U-shaped rotary part 336 to form the sixth revolute joint 10. The third spindle mounting part 338 is mounted on the third spherical rotary part 337 to form the seventh revolute joint 14; and the rotation axes of the sixth and seventh revolute joints are vertical to/angled to each other to form a Hooke's joint or a universal joint. The third spindle mounting part 338 is fixedly connected with the spindle 37.

In another embodiment of the present invention, each of the second chain 32, the third chain 33, the fourth chain 34 and the fifth chain 35 comprises the second motor. One end of the second motor is connected with the portable frame 36 through a spherical joint or three revolute joints, and rotation axes of the three revolute joints are vertical to each other. The nut of the second screw-nut pair is fixedly connected with the second motor. The rotational DOF around the nut axis is able to be locked by a groove so as to achieve the translational DOF along the chain. The screw of the second screw-nut pair is connected with the spindle 37 through a Hooke's joint or a universal joint or two revolute joints, and rotation axes of the two revolute joints are vertical to each other.

Further, in one embodiment of the present invention, the portable 5-DOF parallel module 3 is mounted on the guide rail 12, such that it can increase the movement stroke of the machine tool and achieve the machining of the large and complex components.

Further, in one embodiment of the present invention, after the portable 5-DOF parallel module 3 has finished machining the workpieces on the CNC rotary table 2, the portable 5-DOF parallel module 3 can move to the position of a next mounted workpiece to be machined via a hoisting device. Thus, the machining of the workpieces and the mounting of the next workpiece are simultaneously conducted, the mounting time of the next workpieces is saved, and the usage rate of the portable 5-DOF parallel module is improved.

Figure 6:
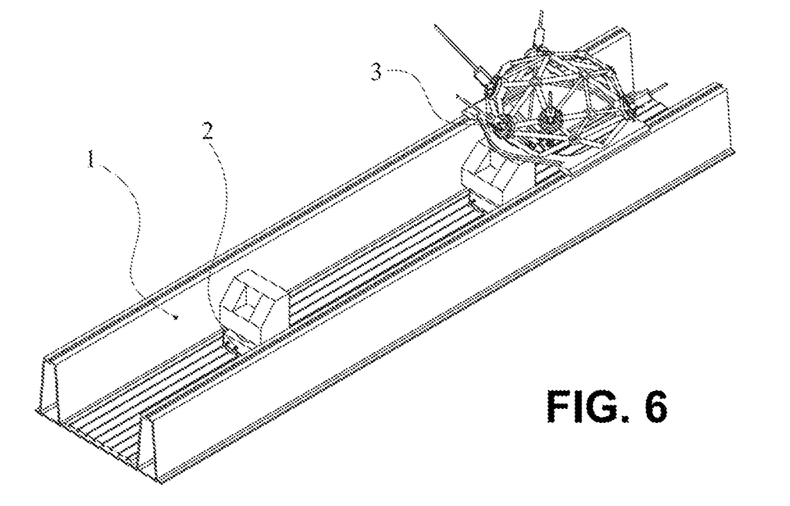
FIG. 6 is a schematic structural diagram of a machining device based on a portable 5-DOF parallel module according to another embodiment of the present invention.
Figure 7:
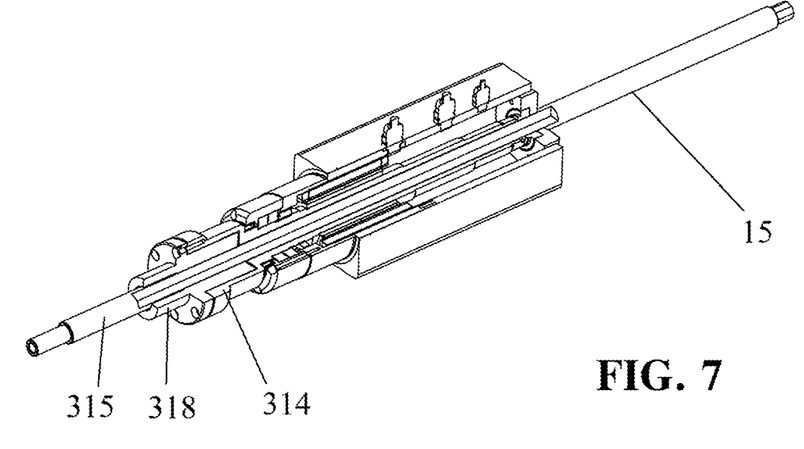
FIG. 7 is a schematic structural diagram of a screw-nut pair and nut thereof based on a portable 5-DOF parallel module of the present invention.

In one embodiment of the present invention, FIG. 6 shows another embodiment of the machining device based on a portable 5-DOF parallel module. After the machining of the workpieces is completed, the portable 5-DOF parallel module 3 can move to the position of a next mounted workpiece through a large-stroke table to machine the next workpiece.

The parallel module of the machining device based on a portable 5-DOF parallel module in the embodiments of the present invention is flexible to move. After the parallel module is mounted on the table, its stroke can be increased. Using the parallel module, the machining of the large and complex components can be achieved, the machining of the workpiece and the mounting of the next workpiece can be simultaneously conducted at different positions, and the usage rate and the production efficiency of the portable parallel module are improved.

In the description of the present invention, it should be understood that orientations or position relationships indicated by terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", etc. are orientations or position relationships as shown in the accompanying drawings, and these terms are just used to facilitate description of the present invention and simplify the description, but not to indicate or imply that the mentioned apparatus or elements must have a specific orientation and must be established and operated in a specific orientation, and thus, these terms cannot be understood as a limitation to the present invention.

Moreover, the terms such as "first", "second", and the like described in the present invention are used herein only for the purpose of description and are not intended to indicate or imply relative importance, or implicitly indicate the number of the indicated technical features. Therefore, features defined by "first" and "second" may explicitly or implicitly include at least one of the features. In description of the present invention, "a plurality of" means at least two, for example, two or three, unless otherwise clearly and specifically limited.

In the present invention, unless otherwise clearly specified and limited, meanings of terms "installation", "connected", "connection", "fixing", and the like should be understood in a board sense. For example, "connection" may be a fixed connection, a removable connection, or integration; may be a mechanical connection or an electrical connection; may be a direct connection or an indirect connection implemented by using an intermediate medium; or may be intercommunication between two components or an interaction relationship between two components, unless otherwise clearly limited. A person of ordinary skill in the art may understand specific meanings of the foregoing terms in the present invention based on a specific situation.

In the present invention, unless otherwise clearly specified and limited, the first feature being "above" or "below" the second feature may include the first feature and the second feature being in direct contact, or may also include the first feature and the second feature being in indirect contact via an intermediate medium. Further, the first feature being "over", "above" or "on the top of" the second feature may include the first feature being directly above or obliquely above the second feature, or merely indicates the horizontal height of the first feature being greater than that of the second feature. The first feature being "under", "below" or "underneath" the second feature may include the first feature being directly below or obliquely below the second feature, or merely indicates the horizontal height of the first feature being less than that of the second feature.

Reference to phrases such as "an embodiment", "some embodiments", "an example", "a specific example", and "some examples" in the specification mean that specific features, structures, materials or characteristics described in combination with the embodiment(s) or example(s) are included in at least one embodiment or example of the present invention. In the specification, the schematic expressions of the phrases do not necessarily refer to the same embodiment or example. Moreover, the described specific features, structures, materials or characteristics may be combined in any suitable manner in one or more embodiments or examples. Additionally, in a non-conflicting situation, those skilled in the art may joint and combine different embodiments or examples and features of different embodiments or examples described in the specification.

Although the embodiments of the present invention have been illustrated and described, it should be understood that the above embodiments are exemplary and should not be construed as limitations to the present invention. Those of ordinary skill in the art may make changes, modifications, replacements and variations to the above embodiments without departing from the scope of the present invention.

What is claimed is:

1. A machining device comprising:
a table on which a machine tool, the machine tool comprising a portable 5-degree of freedom (5-DOF) parallel module, is slidably moved to a position of a component;
a computer numerical control (CNC) rotary table; and
the portable 5-degree of freedom (5-DOF) parallel module, which portable 5-DOF module is configured to interact with the CNC rotary table to achieve five-face machining of the component, a tool spindle of the portable 5-DOF parallel module is configured to move in a first swing angle range to convert between vertical and horizontal machining modes, wherein the portable 5-DOF parallel module comprises:
a portable frame;
the spindle; and
a first kinematic chain, a second kinematic chain, a third kinematic chain, a fourth kinematic chain and a fifth kinematic chain, each of which is configured to connect the portable frame to the spindle to achieve five-axis motion of the spindle,
wherein the first chain is connected to the portable frame through first and second revolute joints and to the spindle through a third revolute joint, rotation axes of the first and second revolute joints are angled relative to each other, the first chain comprises an input-driven first screw-nut pair, a first nut of the first screw-nut pair is enabled to rotate about a nut axis so as to cause a first screw of the first screw-nut pair to translate relative to the first nut along a length direction of the first chain;

wherein each of the second, third, fourth, and fifth chains is connected to the portable frame through a respective pair of fourth and fifth revolute joints and to the spindle through a respective pair of sixth and seventh revolute joints, wherein a respective rotation axis of each of the fourth revolute joints is angled relative to a respective rotation axis of the corresponding fifth revolute joint, and wherein a respective rotation axis of each of the sixth revolute joints is angled relative to a respective rotation axis of the corresponding seventh revolute joint;

wherein each of the second, third, fourth, and fifth chains comprises a respective input-driven second screw-nut pair, each second screw-nut pair comprising a respective second nut and a respective second screw, wherein each second nut is enabled to rotate about a respective nut axis so as to cause the corresponding second screw to translate relative to the corresponding second nut along a length direction of a corresponding one of the second, third, fourth, and fifth chains; and wherein each of the second, third, fourth, and fifth chains comprises a respective U-shaped rotary part, a respective spherical rotary part and a respective spindle mounting part, wherein each of the U-shaped rotary parts is fixedly connected with one end of the corresponding one of the second screws, which one end is located away from the corresponding one of the second nuts, wherein each of the U-shaped rotary parts is configured to be mounted on the corresponding one of the spherical rotary parts to form the corresponding sixth revolute joint, wherein each of the spherical rotary parts is configured to be mounted on the corresponding one of the spindle mounting parts to form the corresponding seventh revolute joint, and wherein each of the spindle mounting parts is fixedly connected with an outer side wall of the spindle.

2. The machining device of claim 1, wherein the first chain further comprises a first motor comprising a first end connected to the portable frame through the first and second revolute joints.

3. The machining device of claim 2, wherein the first nut of the first screw-nut pair is fixedly connected to the first motor, the first nut of the first screw-nut pair is enabled to rotate about the nut axis of the first nut so as to cause the first screw of the first screw-nut pair to translate relative to the first nut along the length direction of the first chain, and wherein the first screw of the first screw-nut pair is connected to the spindle via the third revolute joint.

4. The machining device of claim 1, wherein each of the second, third, fourth, and fifth chains further comprises a respective second motor, and wherein each of the second motors comprises a respective first end connected to the portable frame through the corresponding pair of fourth and fifth revolute joints.

5. The machining device of claim 4, wherein each of the second screws is connected with the spindle through the corresponding pair of sixth and seventh revolute joints, and wherein each of the second nuts is fixedly connected to the corresponding second motor, wherein each of the second nuts is enabled to rotate about the respective nut axis so as to cause the corresponding second screw to translate relative to the corresponding second nut along the corresponding length direction of the corresponding one of the second, third, fourth, and fifth chains.

6. The machining device of claim 1, wherein the first swing angle range meets a preset condition to enable the spindle of the portable 5-DOF parallel module to convert between vertical and horizontal machining modes.

7. The machining device of claim 1, wherein the 5-DOF parallel module is moveable from a first position to machine a first component to a second position to machine a second component by sliding on the table.

* * * * *